United States Patent [19]

Nauroth et al.

[11] 4,208,316
[45] Jun. 17, 1980

[54] HYDROPHOBIC PRECIPITATED SILICIC ACID AND COMPOSITIONS CONTAINING SAME

[75] Inventors: Peter Nauroth, Wesseling; Heinz Esch, Wesseling-Urfeld; Robert Kuhlmann, Erftstadt; Rudolf Bode, Bad Orb; Arthur Reisert, Kahl; Harald Bühler; Günter Türk, both of Hanau, all of Fed. Rep. of Germany

[73] Assignee: Deutsche Gold- und Silber-Scheideanstalt Vormals Roessler, Frankfurt am Main, Fed. Rep. of Germany

[21] Appl. No.: 920,515

[22] Filed: Jun. 29, 1978

[51] Int. Cl.² .............................................. C08L 83/04
[52] U.S. Cl. ........................... 260/37 SB; 106/308 Q; 260/42.15; 427/220; 428/405
[58] Field of Search ....................... 260/37 SB, 42.15; 106/308 Q; 428/405; 427/220

[56] References Cited

U.S. PATENT DOCUMENTS

| 2,802,850 | 8/1957 | Wetzel ............................. 260/37 SB |
| 3,656,981 | 4/1972 | Beschke et al. .................. 106/308 Q |
| 3,677,784 | 7/1972 | Nitzsche et al. ................. 260/37 SB |
| 3,847,848 | 11/1974 | Beers ................................ 260/37 SB |
| 3,904,787 | 9/1975 | Trebinger et al. ................... 427/220 |
| 4,038,224 | 7/1977 | Eisenmenger et al. .......... 106/308 Q |
| 4,072,796 | 2/1978 | Reinhardt et al. ................ 260/42.15 |

FOREIGN PATENT DOCUMENTS 1074559 2/1960 Fed. Rep. of Germany ........... 427/220

Primary Examiner—Lewis T. Jacobs
Attorney, Agent, or Firm—Beveridge, DeGrandi, Kline & Lunsford

[57] ABSTRACT

Hydrophobic precipitated silicic acid is disclosed and its use as a reinforcing filler in plastic masses which are hardenable to form elastomers.

6 Claims, 1 Drawing Figure

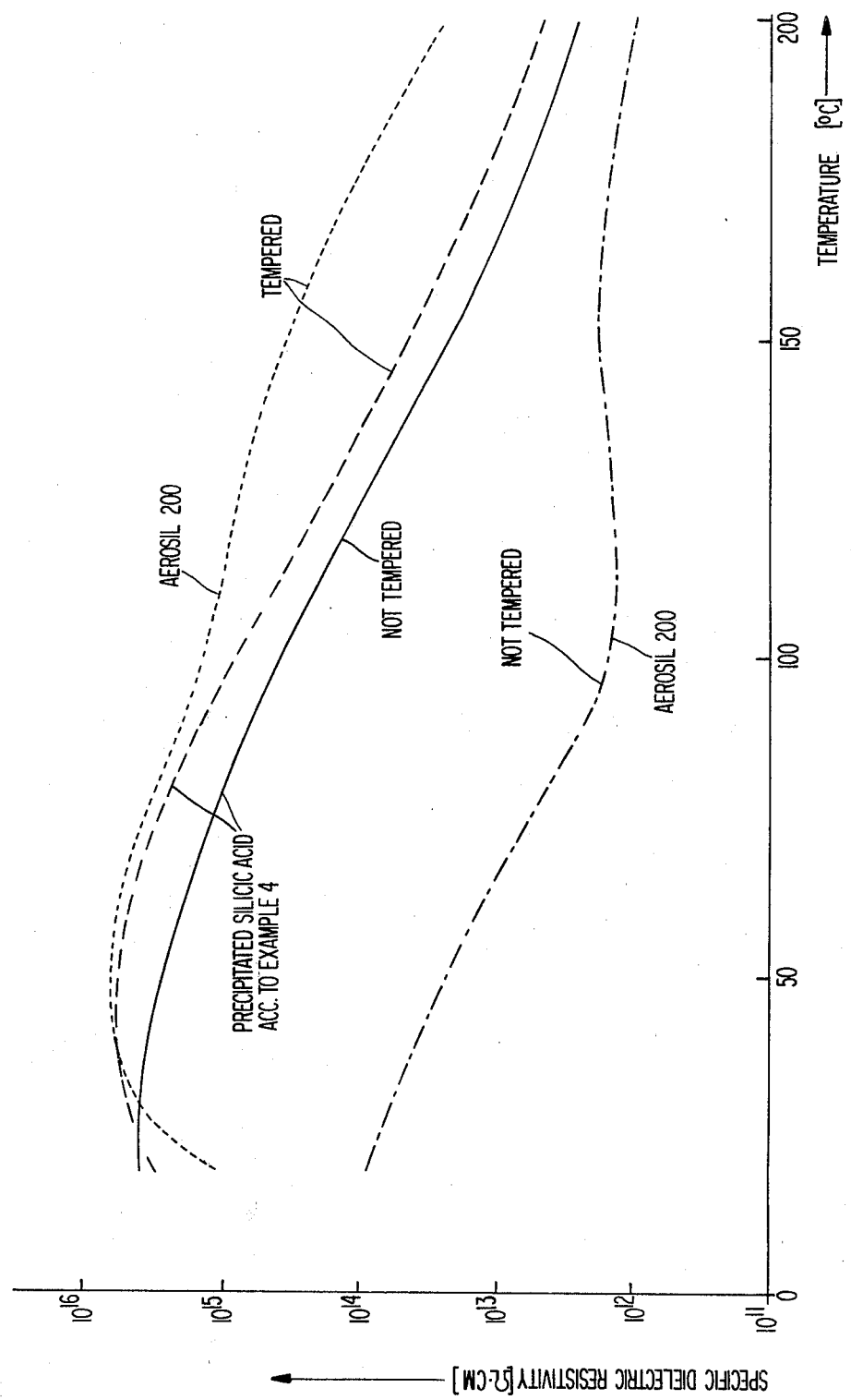

HYDROPHOBIC PRECIPITATED SILICIC ACID AND COMPOSITIONS CONTAINING SAME

The invention relates to a hydrophobic precipitated silicic acid and its use as a reinforcing filler in synthetic or natural plastic masses that may be hardened to elastomers. The invention further relates to products made from the reinforced elastomers.

Fillers are solid substances which are generally of inorganic origin and varied composition, the particles of which may range from fine to rough grained and of varied shape and which are added to a chemical industrial product in order to improve certain characteristics.

It is an object of the present invention to provide a hydrophobic precipitated silicic acid, which has the following characteristics:

| | | |
|---|---|---|
| BET-surface | m²/g | 110 ± 40 |
| Average size of the primary particles from EM records | mμ(nm) | 15–22 |
| Loss at drying according to DIN 55 921 after 2 hrs at 105° C. | % | <2.5 |
| Loss at red heat (related to the substance dried 2 hrs at 105° C.) according to DIN 55 921 | % | 5.5 ± 1.5 |
| pH value (in 5% aqueous methanolic suspension) according to DIN 53200 | | 7.5 ± 1.0 |
| Conductivity (in 4% aqueous methanolic suspension) | μS | <600 |
| Tamping density of the unaerated substance according to DIN 53 194 | g/l | 130 ± 40 |
| Wettability with water | | <0.1 |
| Carbon content | % | 2.5 ± 0.6 |
| Water absorption at 30° and 30% RH (relative humidity) | % | 1.2 ± 0.4 |
| at 30° and 70% RH (relative humidity) | % | 1.5 ± 0.5 |

In a preferred embodiment of the hydrophobic precipitated silicic acid of the invention, the loss at drying may range from 2.5 to 0.0%. The conductivity of the hydrophobic precipitation silicic acid of the invention may preferably range from 50 to 300 μS. The wettability with water may preferably range from 0 to 0.05.

A further object of the present invention resides in a process for the production of hydrophobic precipitated silicic acid, which comprising providing an original aqueous alkaline suspension containing a hydrophilic silicic acid with the following physico-chemical characteristics (obtained after separation from the precipitated suspension, intensive washing with water and extended drying of the hydrophylic precipitated silicic acid):

| | | |
|---|---|---|
| BET-surface according to DIN 66 131 | m²/g | 160 ± 40 |
| Average size of the primary particles from EM records | mμ(nm) | 14–22 |
| Loss in weight at drying according to DIN 55 921 after 2 hrs at 105° C. | % | 2.5–4.0 |
| Loss in weight at red heat (related to substance dried 2 hrs at 105° C.) according to DIN 55 921 | % | 3.5 ± 1.0 |
| pH value (in 5% aqueous suspension) according to DIN 53 200 | | 7.0–8.5 |
| Conductivity in 4% aqueous suspension | μS | <600 |
| Tamping density of the unaerated substance according to DIN 53 194 | g/l | 140 ± 40 |
| SO₃ content (relating to substance dried 2 hrs at 105° C.) | % | <0.3 |
| Na₂O content (relative to substance dried 2 hrs at 105° C.) | % | <0.3 | and introducing into the aqueous alkaline suspension as described above, a hydrophobic producing agent while maintaining an alkaline pH value in the original suspension to obtain a mixture, stirring the mixture thus obtained, separating the hydrophobic precipitated silicic acid thus obtained, drying for a sufficient duration, tempering the product thus obtained for 60 to 180 minutes, preferably 70 to 130 minutes at a temperature of 200° to 400° C. and thereafter grinding it to produce a finely divided product with the indicated average particle size range.

The invention is illustrated by FIG. 1 which shows a plot of specific dielectric resistivity versus temperature.

The original aqueous alkaline suspension of the hydrophylic precipitated silicic acid may be obtained as follows:

1 part by volume of water is introduced into a suitable reaction vessel. From 0.15 to 0.25 parts by volume of a sodium silicate solution (ratio $SiO_2:Na_2O=3.5$ and 26% $SiO_2$) and 0.015 to 0.025 parts by volume of $H_2SO_4$(96% conc.) are slowly added to the reaction vessel while stirring, whereby an alkaline pH value is maintained in the mixture during the addition. After completing the addition of sodium silicate and $H_2SO_4$, the pH value of the suspension obtained is in the weakly alkaline range.

The agents which are used according to the invention to create the hydrophobic effect and which are reacted with the original hydrophylic silicic acid suspended in the aqueous phase to convert it to a hydrophobic product are organo silicon compounds. Included among the suitable organo silicon compounds are those which may be represented by the general formula:

$(R_3Si)_aZ$;

wherein R is the same or different monovalent, optionally substituted and/or polymeric, hydrocarbon radicals, a is 1 or 2, and Z is halogen, hydrogen or a radical of the formula: —OH, —OR, —NRX, —ONR₂, —SR, —OOCR, —O—, —N(X)— or —S—, wherein R always has the above stated meaning and X is hydrogen or has the same meaning as R.

Examples of suitable organo silicon compounds are hexamethyl disilazan, trimethylsilane, trimethylchlorosilane, trimethylethoxysilane, triorganosilyl mercaptans such as trimethylsilane mercaptan, triorganosilylacylates such as vinyldimethylacetoxysilane, triorganosilylamines such as trimethylsilylisoprolyamine, trimethylsilylethylamine, dimethylphenylsilylpropylamine and vinyldimethylsilylbutylamine, triorganosilylaminoxy compounds such as diethylaminoxytrimethylsilane and diethylaminoxydimethylphenyl silane; furthermore hexamethyldisiloxane, 1,3-divinyltetramethyldisiloxane,1,3-diphenyltetramethyldisiloxane and 1,3-diphenylhexamethyldisilazane.

Additional examples for organosilicon compounds, which may be reacted within the scope of the invention with the original aqueous alkaline suspension of hydrophylic silicic acid are the following: dimethyldichlorosilane, dimethyldiethoxysilane, dimethylethoxysilane, dimethyldimethoxysilane, diphenyldiethoxysilane, vinylmethyldimethoxysilane and octamethylcyclotetrasiloxane, and/or dimethylpolysiloxanes with 2 to 12 siloxane units per molecule and always containing an Si-bound hydroxyl group in the terminal units.

Mixtures of different organosilicon compounds may also be used according to the invention to react with the hydrophibic silicic acid present in the original aqueous precipitated suspension.

In a preferred embodiment of the invention dimethylchlorosilane may be used as the hydrophobic producing agent. By the term hydrophobic producing agent is meant any of the above mentioned organosilion compounds or their art recognized equivalents.

The organosilicon compounds which are reacted with aqueous alkaline original suspensions of hydrophylic precipitated silicic acid, according to the invention are used preferably in quantities of 5 to 30% by weight, relative to the weight of the precipitated silicic acid reacted therewith.

A further object of the invention is the use of the hydrophobic precipitated silicic acid of the invention as a reinforcing filler in natural or synthetic plastic masses hardenable into elastomers; and especially in diorganopolysiloxane elastomeric polymers. For example, in a preferred embodiment the hydrophobic precipitated silicic acid of the invention may be used in a single component, silicon rubber hardenable mass for sealing or caulking of cracks and the like. One component and two component hardenable compositions are known in the art as shown for example in U.S. Pat. Nos. 3,122,516, 3,464,951 and 3,334,067 and in British Pat. No. 1,110,429. These prior art documents are relied on herein for their disclosures and incorporated.

Furthermore, the filler of the invention may be used in organopolysiloxane elastomers, hardenable at room temperature as for example, preferably in a two-component silicon printing composition.

According to the invention, the hydrophobic precipitated silicic acid may also be used in hot vulcanizing diorganopolysiloxane elastomers. They may be used for example, as a cable insulation material.

All diorganopolysiloxanes may be used for purposes of the invention which hitherto were used or could be used as the basis for plastic masses hardenable or hardening into organopolysiloxane elastomers at room temperature (RTV) or only slightly higher temperature (LTV) or high temperature (HTV). They are known in the art and may be represented for example, by the general formula:

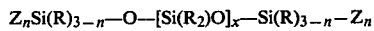

in which R is the same or different monovalent, optionally substituted and/or polymeric hydrocarbon radicals, Z is a hydroxyl group, hydrolyzable group and/or hydrolyzable atom, or in case of there being only masses hardenable at slightly elevated temperature, alkenyl groups, n is 1,2 or 3 and x a whole number with a value of at least 1.

Examples of hydrocarbon radical R are alkyl radicals, such as methyl, ethyl, propyl, butyl, hexyl and octyl radicals; alkenyl radicals such as the vinyl, allyl, ethylallyl and butadienyl radical; and aryl radicals such as phenyl and tolyl.

Examples of subtituted hydrocarbon radicals R are especially halogenated hydrocarbon radicals, such as 3,3,3-trifluoropropyl, chlorophenyl and bromotolyl; and cyanoalkyl radicals such as beta-cyanoethyl.

Examples of polymeric (may also be designated as "modifying") substituted and unsubstituted hydrocarbon radicals R, are polystyrl, polyvinylacetyl, polyarylyl, polymethacrylyl and polyacrylic nitrilyl radicals bound to silicon by way of carbon.

At least the majority of the radicals R consist preferably of methyl groups largely because of easier accessability. Any remaining radicals R, are preferably vinyl and/or phenyl groups.

Particularly in case of masses hardenable to elastomers at room temperature in the presence of water and storable under moisture free conditions, Z is generally a hydrolizable group. Examples of such groups are amino, amido, aminoxy, oxime, alkoxy, alkoxyalkoxy—(for example, $CH_3OCH_2CH_2O$—), alkenyloxy-(for example, $H_2C=(CH_3)CO$—), acyloxy and phosphato groups. Above all, acetoxy groups are preferred as the Z acyloxy group, chiefly because of their easier accessability. However, for example, when Z is an oxime group such as those of the formula $—ON=C(CH_3)(C_2H_5)$, excellent results will be achieved.

Examples of hydrolyzable atoms Z are halogen and hydrogen atoms. Examples of alkenyl groups Z are especially vinyl groups. It should be noted that the same or different Z groups may be bound to an Si-atom. Mixtures of different diorganopolysiloxanes may be used.

According to the invention, masses hardenable to elastomers, especially with exclusion of water, and in the case of admission of water, masses hardening to elastomers at room temperature can be produced from the hydrophobic silicic acid described herein, by mixing the diorganopolysiloxanes and possibly additional substances at room temperature or at only slightly elevated temperature, optionally after addition of crosslinking agents. This mixing may be accomplished in any known manner, as for example in mechanical mixing devices.

Preferably the fillers used according to the invention are used in quantities of 5 to 50% by weight, related to the total weight of the masses hardenable to elastomers. In the case of HTV organo polysiloxane elastomers, from 5 to 50% by weight may be used. In case of RTV organopolysiloxane elastomers, from 5 to 35 preferably 5 to 25% by weight may be used.

Whenever, as sole terminal units capable of reacting only such units with Si-bound hydroxyl groups are present in the diorganopolysiloxanes, containing terminal units capable of reactions, then these diorganopolysiloxanes, in order to harden them in a per se known manner, or in order to convert them into compounds hardening to elastomers by the water contained in the air, optionally with the addition of more water, must be converted with crosslinking agents, and further optionally in the presence of a condensation catalyst in a known manner. In case of HTV-diorganopolysiloxane elastomers, one may use, in case of correspondingly high temperatures, organic peroxides, such as for example, bis-2.4 dichlorobenzoyl peroxide, benzoylperoxide, dicumylperoxide, tertiary butylperbenzoate or tert. butylperacetate as a crosslinking agent.

As hot volcanizing organosiloxanes one may use such substances wherein the organic substituents of which consist of methyl, ethyl, phenyl, trifluoromethyl phenyl[$F_3CC_6H_4$], or trimethyl silmethyl radicals [$(CH_3)_3SiCH_2-$], for example, dimethyl, diethyl, phenyl, methyl, phenylethyl, ethylmethyl, trimethylsilylmethylene methyl, trimethylsilylmethylene ethyl, trifluoromethylphenylmethyl, or trifluoromethylphenylethyl siloxane or copolymerisates of such compounds. In addition the polymerisates may contain limited quantities of diphenylsiloxane, bis-trimethylsilyl methylene siloxane, bis-trifluoromethyl phenylsiloxane units as well as siloxanes with units of the formula $RSiO_{1.5}$ and $R_3SiO_{0.5}$, whereby R represents one of the above radicals.

Examples for crosslinking agents are particularly silanes of the general formula:

$$R_{4-t}SiZ'_t$$

in which R has the meaning stated above, Z', is a hydrolizable group and/or a hydrolizable atom and t is 3 or 4. The previously mentioned examples for hydrolizable groups Z and hydrolizable atoms Z apply equally for the hydrolizable groups Z' and the hydrolizable atoms Z'.

Examples of silanes of the above formula are methyl triacetoxysilane, isopropyl triacetoxysilane, isopropoxy triacetoxysilane, vinyltriacetoxysilane, methyl trisdiethylamino oxysilane, methyl tris (-cyclohexylamino)-silane, methyltris (-diethylphosphate)-silane and methyltris (-methylethylketoximo)-silane.

Furthermore, for example, polysiloxanes, which contain at least 3 Z' groups or atoms per molecule, may also be used instead of or mixed with silances of the above formula, whereby the silicon valencies not saturated by Z' group or atoms, are saturated by siloxane oxygen atoms and optionally R groups. The best known examples of crosslinking agents of the latter type are the polyethylsilicates with an $SiO_2$ content of about 40% by weight, hexaethoxydisiloxane and methane polysiloxane.

The best known examples for condensation catalysts are tin salts of fatty acids, such as dibutyltindilaurate, dibutyltindiacetate and tin-(II)-octoate.

Whenever units with alkenyl groups are present as the only reactive terminal units in the diorganopolysiloxanes containing reactive terminal units, then the hardening into elastomers may take place in a known manner with organopolysiloxanes, which contain on an average at least 3 Si-bound hydrogen atoms per molecule, such as methanepolysiloxane, in the presence of catalysts, such as platinum-(IV)-chloricacid, promoting the addition of alkenyl group to Si-bound hydrogen. In that case there are at room temperature or at only slightly higher temperature (mostly 50° to 80° C.) hardenable (LTV) masses available.

Finally, as an other example for the hardening into elastomers there should be mentioned the use of polycyclic organopolysiloxanes in the presence of equilibration catalysts, such as phosphorus nitrile chlorides.

Naturally, the masses hardenable into elastomers, beside diorganopolysiloxanes, precipitated silicic acid according to the invention, crosslinking agents and crosslinking catalysts, may optionally contain conventional fillers used in masses hardenable into elastomers.

Examples of such substances are fillers with a surface area less than 50 $m^2/g$, such as quartz powder, diatomaceous earth, zirconium silicate and calcium carbonate, untreated, pyrogenic silicondioxide, organic resins such as polyvinylchloride powder, organopolysiloxane resins, fibrous fillers such as asbestos, glass fibers and organic fibers, pigments, soluble dyes, aromatics, corrosion inhibitors, agents stabilizing the masses against the effect of water, such as acetic acid anhydride, agents for delaying or retarding the hardening or curing, such a benzotriazole and softeners, such as dimethylpolysiloxanes, endblocked by trimethyl siloxy groups.

The above enumerated combination of physico-chemical data relating to the hydrophobic precipitated silicic acid of the invention, because of its excellent dispersability will lead to a highly effective reinforcing and strengthening filler. The aquilibrium moisture content, clearly reduced as compared to known precipitated silicic acids, produces advantages during processing, for example in the case of pressureless vulcanization where a cured product is obtained with fewer bubbles as compared to the use of the known hydrated precipitated silicic acid. The electrolyte content combined with the low moisture content leads to good electrical characteristics in the cured product. In cold-hardenable silicon-rubber sealing masses, the hydrophobic precipitated silicic acid of the invention, on the basis of its low water content, exhibits advantages in storage stability of the un-cured masses.

The production of and the physico-chemical data and the use of the hydrophobic precipitated silicic acid of the invention will be explained and described in more detail on the basis of the following illustrative examples:

EXAMPLE 1

Production of the original precipitation suspension of a hydrophylic silicic acid for the subsequent wet hydrophobation.

50.0 $m^3$ of water are put into a reaction vessel. Slowly, 9.2 $m^3$ of sodium silicate solution and 0.9 $m^3$ $H_2SO_4$ are added to the vessel while stirring, whereby an alkaline pH value is maintained in the mixture during the addition. After completing the addition of sodium silicate and $H_2SO_4$ the pH value of the suspension obtained lies within the alkaline range.

For the determination of the physical and chemical properties of the hydrophylic silicic acid, a part of the suspension is filtered off, washed until "poor in electrolyte," subsequently dryed in the drying cabinet at 105° C. up to constant weight and is ground in a disk mill.

The hydrophylic silicic acid obtained has the following physico-chemical characteristic data:

| | | |
|---|---|---|
| BET-surface according to DIN 66 131 | $m^2/g$ | 155 |
| Average size of primary particles from EM-records | mμ(nm) | 18 – 20 |
| Loss at drying according to DIN 55 921 after 2 hrs at 105° C. | % | 3.0 |
| Loss at red heat (related to substance dried for 2 hrs at 105° C.) according to DIN 55 921 | % | 3.3 |
| pH value (in 5% aqueous suspension) according to DIN 53 200 | | 7.7 |
| Conductivity (in 4% | | |

| | | |
|---|---|---|
| aqueous suspension) | μS | 240 |
| Tamping density of the unaerated substance according to DIN 53 194 | g/l | 140 |
| SO₂ content (related to the substance dried 2 hrs at 105° C.) | % | 0.22 |
| Na₂O content (related to the substance dried 2 hrs at 105° C.) | % | 0.18 |

METHOD FOR THE DETERMINATION OF THE ELECTRIC CONDUCTIVITY

A sample of 4.0 silicic acid is heated in 50 ml fully desalinated water in a 150 ml glass beaker and is boiled for one minute while stirring. Subsequently, the suspension is transferred into a 100 ml measuring flask, is cooled down, and is then filled up to the mark with fully desalinated water. After agitating, the measuring cell of the conductivity measuring device is first preliminarily flushed with the suspension to be measured and is then filled or the measuring cell is submerged into the suspension. The electric conductivity is read from the measuring device and the temperature of the suspension is determined during the measurement.

Calculation: The electric conductivity is given in $\mu S$ related to 20° C.

EXAMPLE 2

Production of a hydrophobic precipitated silicic acid of the invention obtained by wet hydrophobing.

While maintaining a pH value of the suspension of 8.5, 193 g. of dimethyldichlorosilane are added under intensive stirring during a time of 30 minutes to 10 l. of an original aqueous suspension of silicic acid according to example 1 with a solid concentration of 57.9 g/l. After a subsequent mixing time of 60 minutes the precipitated silicic acid, covered (coated) at 25% with dimethylchlorosilane, is separated, is dryed at 105° C., tempered at 350° C. for 2.0 hrs, and subsequently ground.

The hydrophobic precipitated silicic acid thus obtained, has the following physico-chemical characteristics:

| | | |
|---|---|---|
| Loss at red heat at 1000° C. according to DIN 55 921 | % | 5.5 |
| Of this, moisture at 105° C. according to DIN 55 921 | % | 0.4 |
| pH value according to DIN 53 200 | | 8.0 |
| BET-surface according to DIN 66 131 | m²/g | 89 |
| Wettability with water | % | 0.05 |
| Conductivity | μ S | 160 |
| C - content | % | 2.2 |
| Water absorption at | | |
| 30° C. and 30% RH | % | 1.2 |
| at 30° C. and 70% RH | % | 2.0 |
| Tamping density of the unaerated substance according to DIN 53 194 | g/l | 130 |

DETERMINATION OF THE WATER-WETTABILITY OF HYDROPHOBIC SILICIC ACIDS

The determination of the water-wettable parts of hydrophobic silicic acid is described in the following method of analysis.

CARRYING OUT THE DETERMINATION 0.2 g of hydrophobic silicic acid are placed with 50 ml of distilled water into a 250 ml vibrating funnel and are vibrated at the highest speed for 1 minute with the help of a Turbula-mixer.

After short settling of the wetted parts, 45 ml of the suspension after cautious agitation are drained into an evaporating pan, are evaporated on a waterbath and are then dryed at 105° C.

Calculation: $\frac{\text{dry residue} \cdot 100}{\text{weighed sample}} = \%$ water-wettable parts

DETERMINATION OF MOISTURE ABSORPTION

In case of the determination of the moisture absorption the maximum or time-dependent moisture absorption of silicic acids is determined in dependence on the temperature and of the relative humidity of the air.

METHOD FOR THE DETERMINATION

A silicic acid sample of about 2.5 g is weighed in up to 0.1 mg. exactly, into a dry calibrated weighing bottle and is dried for 2 hours at 105° C. After cooling, the weight is determined on an analytical balance. Subsequently, the open weighing bottle is kept with the sample in a conditioning cabinet at a predetermined temperature and relative humidity of the air. One may then either determine a moisture absorption/time diagram or the maximum moisture absorption.

Customarily the determination is made at
30° C. and 30% relative humidity of the air
30° C. and 70% relative humidity of the air Calculation: $\frac{\text{g. weigh out} \cdot 100}{\text{g. weigh in*}} = \%$ moisture absorption

*dried sample

EXAMPLE 3

Use of a hydrophobic precipitated silicic acid of the invention in cold hardening 1—component silicon rubber masses.

In this example the hydrophobic precipitated silicic acid of the invention according to example 2, is tested as a reinforcing filler and thixotroping agent in a 1-component silicon rubber crack-sealing mass (cold curing).

In case of these experiments, the silicic acid Aerosil 150$^R$ of the Degussa Company as well as the commercial product HDK H2000 of the Wacker Company were used for comparison in the same silicon rubber mass.

HDK H2000$^R$ is a highly dispersed silicic acid, which is produced by flame-hydrolysis from volatile silicon masses and is subsequently hydrophobed by reaction with organosilanes. It is therefore tightly covered with trimethylsilyl groups on the surface and has the following physico-chemical characteristics:

| | | |
|---|---|---|
| Surface according to BET | m²/g | 170 ± 30 |
| SiO₂ content | % by weight | >97 |
| Bulk weight unpressed | g/l | about 90 |
| Moisture according to DIN 53 198 Process (Verf.) A 2 hrs at 105° C. | % by weight | <0.6 |
| Loss at red heat according to DIN 52 911 2 hrs at 1000° C. | % by weight | <2.5 |
| pH value according to DIN 53 200 in 4% dispersion in water-methanol = 1:1 | | 6.7–7.7 |
| Grit according to Mocker (Din 53 580) | % by weight | <0.05 |
| Adhering (retained) HCL | % by weight | <0.020 |
| Al₂O₃ | % by weight | <0.05 |
| Fe₂O₃ | % by weight | <0.005 |
| TiO₂ | % by weight | <0.003 |
| C | % by weight | <3 |

Aerosil 150$^R$ is a pyrogenically produced silicic acid with the following physico-chemical characteristics.

| | | |
|---|---|---|
| Surface According to BET | m²/g | 150 ± 50 |
| Average size of the primary particles | mµ (nm) | 14 |
| Loss at drying (DIN 53 198/A) (2 hrs at 105° C.) | | 0.5 |
| Loss at red heat (DIN 52 911) (2 hrs at 1000° C.) | | 1 |
| pH value (DIN 53 200) (in 4% aqueous dispersion) | | 3.6–4.5 |
| SiO₂* | % | 99.8 |
| Al₂O₃ | % | 0.05 |
| Fe₂O₃ | % | 0.003 |
| TiO₂ | % | 0.03 |
| HCL | % | 0.025 |
| Grit according to Mocker (DIN 53 580) | % | 0.05 |
| Wetting behavior | | hydrophylic |

*related to the substance roasted 2 hours at 1000° C.

At the same time the following formula with acetate hardener was used as the base composition:

| | |
|---|---|
| 68.4 parts by weight | dimethylpolydiloxane with hydroxyl terminal groups viscosity 50,000 cSt. |
| 271 parts by weight | dimethylpolysiloxane with trimethyl siloxy terminal groups viscosity 1000 cST |
| 4.5 parts by weight | methyltriacetoxysilane (cross-linking agent) |
| 0.0005 pts. by weight plus silicic acid to be tested. | dibutyltindiacetate |

The incorporation of the silicic acid takes place after the addition of the crosslinking agent in an evacuated planetary type mixer.

The paste-like crack-sealing mass or its vulcanisate cured (hardened) for 7 days in the air was then subjected to the following tests:
(a) Extrusion capacity according to ASTM 2452-69 staying power according to the "cap method" (Hütchenmethods)
(c) modulus at 100% expansion according to DIN 53 504
(d) tensile strength according to DIN 53 504
(e) breaking tension according to DIN 53 504
(f) resistance against further tearing according to DIN 53 515
(g) Shore-A-hardeness according to DIN 53 505

The results of these investigations are combined in the following table I. At the same time, the following technical progress may be ascertained as compared to the known pyrogenic silicic acids Aerosil 150 as well as the hydrophobic silicic acid HDK H2000:

Aerosil 150 may only be incorporated up to 8% into the 1-component sealing mass. A higher degree of filling leads to a mass difficult to process. The level of the machanical data attainable at a degree of 8% filler content corresponds to the customary status of the prior art.

On the contrary with the silicic acid of the invention according to example 2 and with a content of 20% filler an essentially higher level of the mechanical data will be achieved, which satisfy the requirements made of highstrength sealing masses. The extrusion of the mass has been fully satisfied at this level of filler content. The stability in storage is good too.

On the other hand in the case of a filler content of 20% the level of values of the mechanical data of the commercial product HDK H2000, which represents the latest status of the prior art, is not comparable to that of the cured products (vulcanizates) containing the precipitated silicic acid of the invention. This is particularly true for the tensile strength and the elongation at break, which both lie 45% below the corresponding values of the silicic acid of the invention. Only in case of an increase of the filler content to 25% may the data for HDK H2000 by considered comparable.

Surprisingly, it was thus found that with the use of only 20% of the precipitated silicic acid a clearly improved set of characteristics (compared to 25% HDK H2000) may be achieved. Moreover, because of the noticeably low production costs as compared to pyrogenic hydrophobic silicic acid, additional possibilities of application will be opened up thereby.

TABLE I

Comparison of a hydrophobic precipitated silicic acid of the invention according to example 2 in a 1-component silicon sealing mass with pyrogenic silicic acid of the prior art.

| Type of silicic acid | (%)* | storage life | (Huetchen method) | Extrudability (g/min) |
|---|---|---|---|---|
| silicic acid according to example 2 | 20 | good | good | 8.2 after 0 days 8.0 after 28 days |
| Aerosil 150 | 8 | good | good | 8 after 0 days 8 after 28 days |
| HDK H2000 | 20 | good | good | 19 after 0 days 22 after 28 days |
| HDK H2000 | 25 | good | good | 11 after 0 days 9 after 28 days |

| Type | Modulus | Tensile | Elongation at | Resistance against continued tear- | Shore |
|---|---|---|---|---|---|

| Type of silicic acid | 100 (%)* | Strength (N/mm²) | break (N/mm) | ing (%) | (N/mm) | hard-iness |
|---|---|---|---|---|---|---|
| Silicic acid According to Example 2 | 20 | 4.6 | 45 | 780 | 16 | 18 |
| Aerosil 150 | 8 | 3.0 | 10 | 400 | 2.5 | 20 |
| HDK H2000 | 20 | 5.0 | 25 | 430 | 15 | 24 |
| HDK H2000 | 25 | 6.0 | 45 | 490 | 18 | 32 |

*% by weight, related to total mixture

EXAMPLE 4

Production of a hydrophobic precipitated silicic acid of the invention, obtained by wet hydrophobing While maintaining a pH value of the suspension of 8.5, 175.6 g of dimethyldichlorosilane are added under intensive stirring during a time of 30 minutes to 12 l. of an original aqueous suspension of the silicic acid according to example 1, with a solids concentration of 57.9 g/l. After a subsequent mixing time of 60 minutes the precipitated silic acid, covered at 20% with dimethyldichlorosilane, is dried at 105° C., is tempered at 350° C. for 1.5 hours and is subsequently ground up. The precipitated silicic acid has the following physico-chemical characteristics:

| | | |
|---|---|---|
| Loss at red heat at 1000° C. according to DIN 55 921 | % | 5.5 |
| Of this the humidity at 105° C. according to DIN 55 921 is | % | 0.4 |
| pH value according to DIN 53 200 | | 7.5 |
| BET-surface according to DIN 66 131 | m²/g | 94 |
| Water-wetability | | 0.06 |
| Conductivity | μS | 92 |
| C-Content | % | 2.1 |
| Water absorption at 30° C. and 30% RH | % | 1.3 |
| at 30° C. and 70% RH | % | 2.0 |
| Tamping density of the unaerated substance according to DIN 53 194 | g/l | 137 |

EXAMPLE 5

Use of a hydrophobic precipitated silicic acid in cable masses according to the invention on the basis of organopolysilicones.

In this example the hydrophobic precipitated silicic acid of example 4 according to the invention is incorporated as reinforcing filler in hot vulcanized silicon rubber and is checked for the electric volume resistance of the cured goods produced therewith.

Owing to its excellent dielectric characteristics, hot-vulcanizing silicon rubber is also used as a high grade cable insulating material. In this case, highly active pyrogenic silicic acid is conventionally used as a filler because of it unity and its favorable dielectric characteristics. It has been known, that the insulating characteristics are improved further, whenever the fully cured compounds are further subjected to an extended tempering process (at least 6 hours) at elevated temperatures (200° C.).

In this test, the following formula was used:

| | |
|---|---|
| 100 parts by weight | of dimethylpolysiloxane with trimethyl siloxy terminal groups as well as with a content of vinyl groups |
| 40 parts by weight | of silicic acid |
| 1.4 parts by weight | of bis-2.4-dichlorobenzoylperoxide (50% as paste in silicon oil) |
| Vulcanization: | 7 min. at 130° C. |
| Tempering: | 0 or 6 hrs. at 200° C. |
| Conditioning: | 24 hours at 22° C. and 80% relative humidity of the air |

The results of the comparison with Aerosil 200 ®*, a pyrogenic silicic acid sold by Degussa are shown in FIG. 1. As is clear from the curves, it is possible to achieve surprisingly similarly good results with precipitated silicic acid of the invention, as with the pyrogenic silicic acid. Furthermore it was found surprisingly, that the good electrical characteristics may also be achieved with the silicic acid of the invention even without the above mentioned expensive tempering process. Beside the more favorable production costs, this represents another advantage of the precipitated silicic acid of the invention.

*Aerosil 200 ® is a highly dispersed silicic acid produced by flame hydrolysis from volatile silicon masses which (silicic acid) has the following physico-chemical characteristics:

| | | |
|---|---|---|
| Surface according to BET | m²/g | 200 ± 25 |
| Average size of the primary particles | mμ | 12 |
| Tamping volume (DIN 53 194) | ml/100g | 1700 |
| Compacted goods | ml/100g | 1000 |
| Loss at drying (DIN 53 198, type A) 2 hrs at 105° C. | % by weight | <1.5 |
| Loss at red heat (DIN 52 911) 2 hrs at 1000° C. | % by weight | <1.5 |
| pH value (DIN 53 200) in 4% aqueous dispersion | | 3.6 – 4.3 |
| SiO$_2$ | % by weight | >99.8 |
| Al$_2$O$_3$ | % by weight | <0.05 |
| Fe$_2$O$_3$ | % by weight | <0.003 |
| TiO$_2$ | % by weight | <0.03 |
| HCl | % by weight | <0.025 |
| Grit according to Mocker (DIN 53 580) | % by weight | 0.05 |

Further embodiments, variations and modifications of the invention will be apparent to those skilled in the art.

We claim:

1. Hydrophobic precipitated silicic acid, having the following characteristics

| | | |
|---|---|---|
| BET-Surface according to DIN 66 131 | m²/g | 110 ± 40 |
| Average size of the primary particles from EM records | mμ (nm) | 15–22 |
| Losses in weight at drying according to DIN 55 921 after 2 hrs at 105° C. | % | <2.5 |

| -continued | | |
|---|---|---|
| Weight loss at red heat (related to the substance dryed 2 hrs at 105° C. according to DIN 55 921 | % | 5.5 ± 1.5 |
| pH value (in 5% aqueous methanolic suspension) according to DIN 53 200 | | 7.5 ± 1.0 |
| Conductivity (in 4% aqueous methanolic suspension) | μS | <600 |
| Tamping density of the un-aerated substance according to DIN 53 194 | g/l | 130 ± 40 |
| Wettability with water | | <0.1 |
| Carbon content | % | 2.5 ± 0.6 |
| Water absorption at 30 ° C. and 30% RH (relative humidity) | % | 1.2 ± 0.4 |
| at 30 ° C. amd 70% RH | % | 1.5 ± 0.5 |

| -continued | | |
|---|---|---|
| (related to the substance dryed 2 hrs at 105° C.) according to DIN 55 921 | % | 3.5 ± 1.0 |
| pH value (in 5% aqueous suspension) according to DIN 53 200 | | 7.0-8.5 |
| Conductivity (in 4% aqueous suspension) | μS | <600 |
| Tamping density of the unaerated substance according to DIN 53 194 | g/l | 140 ± 40 |
| $SO_3$ content (related to the substance dryed 2 hrs at 105° C.) | % | <0.3 |
| $Na_2O$ content (related to the substance dryed 2 hrs at 105° C.) | % | <0.3 |

2. A process for the production of hydrophobic precipitated silicic acid having the characteristics as defined in claim 1, comprising introducing a hydrophobic producing material into an original aqueous suspension of hydrophilic silicic acid having the following physico-chemical characteristics, which characteristics are determined after separation from the precipitation solution, intensive washing with water and an period of drying of the hydrophylic precipitated silicic acid:

| BET surface according to DIN 66 131 | m²/g | 160 ± 40 |
|---|---|---|
| Average size of the primary particles from EM records | mμ (nm) | 14-22 |
| Losses in weight at drying according to DIN 55 921 after 2 hrs at 105° C. | % | 2.5-4.0 |
| Loss at red heat | | | while maintaining an alkaline pH value to obtain a mixture, stirring the mixture thus obtained, separating the hydrophobic precipitated silicic acid, tempering the hydrophobic product obtained, for 60 to 180 minutes, at a temperature of 200°-400° C. and finely dividing the product.

3. Hardenable elastomeric composition comprising an elastomer and the precipitated silicic acid as defined in claim 1 in an amount to produce a strengthening effect in said elastomer.

4. A hardenable elastomeric composition as defined in claim 3 wherein said elastomer is formed from a diorgano polysiloxane.

5. A sealing or caulking composition comprising a silicone rubber and precipitated silicic acid as defined in claim 1, in a sufficient amount to act as a strengthening filler in ad-mixture with said silicone rubber.

6. A cable formed of a rubber composition comprising a silicone rubber containing the precipitated silicic acid as defined in claim 1 as a reinforcing filler.

* * * * *